US 8,433,796 B2

(12) United States Patent
Wang et al.

(10) Patent No.: US 8,433,796 B2
(45) Date of Patent: *Apr. 30, 2013

(54) BOTMASTER TRACEBACK

(75) Inventors: Xinyuan Wang, Clifton, VA (US); Daniel Ramsbrock, Glen Allen, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/441,076

(22) Filed: Apr. 6, 2012

(65) Prior Publication Data

US 2012/0203900 A1    Aug. 9, 2012

Related U.S. Application Data

(63) Continuation of application No. 12/557,993, filed on Sep. 11, 2009, now Pat. No. 8,176,173.

(60) Provisional application No. 61/096,624, filed on Sep. 12, 2008.

(51) Int. Cl.
    G06F 15/173    (2006.01)

(52) U.S. Cl.
    USPC .......................................... 709/224; 709/238

(58) Field of Classification Search .......... 709/223, 709/224, 238; 713/176
    See application file for complete search history.

(56) References Cited

U.S. PATENT DOCUMENTS

| 5,351,296 | A  | * | 9/1994  | Sullivan ......................... 705/70 |
| 7,149,184 | B2 | * | 12/2006 | Takada et al. .................. 370/230 |
| 2003/0018769 | A1 | * | 1/2003  | Foulger et al. ................ 709/223 |
| 2004/0213248 | A1 | * | 10/2004 | Okuda et al. ............... 370/395.1 |
| 2008/0080558 | A1 | * | 4/2008  | Wang et al. .................. 370/474 |
| 2008/0232363 | A1 | * | 9/2008  | Wang et al. .................. 370/389 |

* cited by examiner

Primary Examiner — Brian J Gillis
(74) Attorney, Agent, or Firm — David Grossman; Edgar Rodriguez

(57) ABSTRACT

Embodiments locate a botmaster on a network. A honeynet host is configured to join a botnet and generate a watermarked packet flow by applying a watermark to an outgoing packet flow in response to commands from the botmaster. The watermark is applied to the outgoing packet flow by: choosing distinct packets from the outgoing packet flow; forming packet pair(s) from the distinct packets, that include a reference packet and an encoding packet; and encoding bits in the watermark to the packet pair(s) by increasing the length of the encoding packet when watermark bits have a predetermined value. The cooperating node(s) are configured to: inspect passing packet flows for the watermarked packet flow and generate tracking information related to detection of the watermarked packet flow. The path determination processor is configured to analyze the tracking information to locate a path taken by the watermarked packet flow.

16 Claims, 11 Drawing Sheets

| Monitoring Location | Chaff 1 | Chaff 2 | Chaff 3 | Chaff 4 | Chaff 5 | Control |
|---|---|---|---|---|---|---|
| Chaff Rate (packets/sec) | 0.6719 | 0.4976 | 0.4274 | 0.3236 | 0.2872 | no chaff |
| Source - Maryland | 29.67 | 30.33 | 29.67 | 30.33 | 30.33 | 32 |
| Stepping Stone - California | 31 | 32 | 31.67 | 31.67 | 32 | 32 |
| Botmaster - Germany | 31 | 31.67 | 32 | 31.67 | 31.67 | 32 |

FIG. 6

Table 1. Experiment results for encrypted traffic: Recovered watermark bits (out of 32) at each monitoring station along the watermark's path (averaged from three trials).

BOTMASTER TRACEBACK

CROSS-REFERENCE TO RELATED APPLICATIONS

This application is a continuation of application Ser. No. 12/557,993, filed Sep. 11, 2009, which claims the benefit of U.S. Provisional Application No. 61/096,624, filed Sep. 12, 2008, which is hereby incorporated by reference in its entirety.

STATEMENT REGARDING FEDERALLY SPONSORED RESEARCH OR DEVELOPMENT

This invention was made with government support under Grant No. CNS-0524286 awarded by the National Science Foundation. The government has certain rights in the invention.

BACKGROUND

Botnets are currently one of the most serious threats to computers connected to the Internet. Recent media coverage has revealed many large-scale botnets worldwide. One botnet has reportedly compromised and controlled over 400,000 computers including computers at the Weapons Division of the U.S. Naval Air Warfare Center, U.S. Department of Defense Information Systems Agency. Another recently discovered botnet is suspected to have controlled 1.5 million computers around the globe. It has been estimated that more than five percent of all computers connected to the Internet have been compromised and used as bots. Currently, botnets are responsible for most spam, adware, spyware, phishing, identity theft, online fraud and DDoS attacks on the Internet.

The botnet problem has recently received significant attention from the research community. Most existing work on botnet defense has focused on the detection and removal of command and control (C&C) servers and individual bots. While such a capability is a useful start in mitigating the botnet problem, it does not address the root cause: the botmaster. For example, existing botnet defense mechanisms can detect and dismantle botnets, but they usually cannot determine the identity and location of the botmaster. As a result, the botmaster is free to create and operate another botnet by compromising other vulnerable hosts. Botmasters can currently operate with impunity due to a lack of reliable traceback mechanisms. However, if the botmaster's risk of being caught is increased, the botmaster would be hesitant to create and operate botnets. Therefore, even an imperfect botmaster traceback capability could effectively deter botmasters. Unfortunately, current botmasters have all the potential gains from operating botnets with minimum risk of being caught. Therefore, what is needed to solve the botnet problem is a reliable method for identifying and locating botmasters across the Internet.

BRIEF DESCRIPTION OF THE SEVERAL VIEWS OF THE DRAWINGS

FIG. 6 is a table of experimental results for encrypted traffic an aspect of an embodiment of the present invention.

DETAILED DESCRIPTION OF EMBODIMENTS

Figure 1:
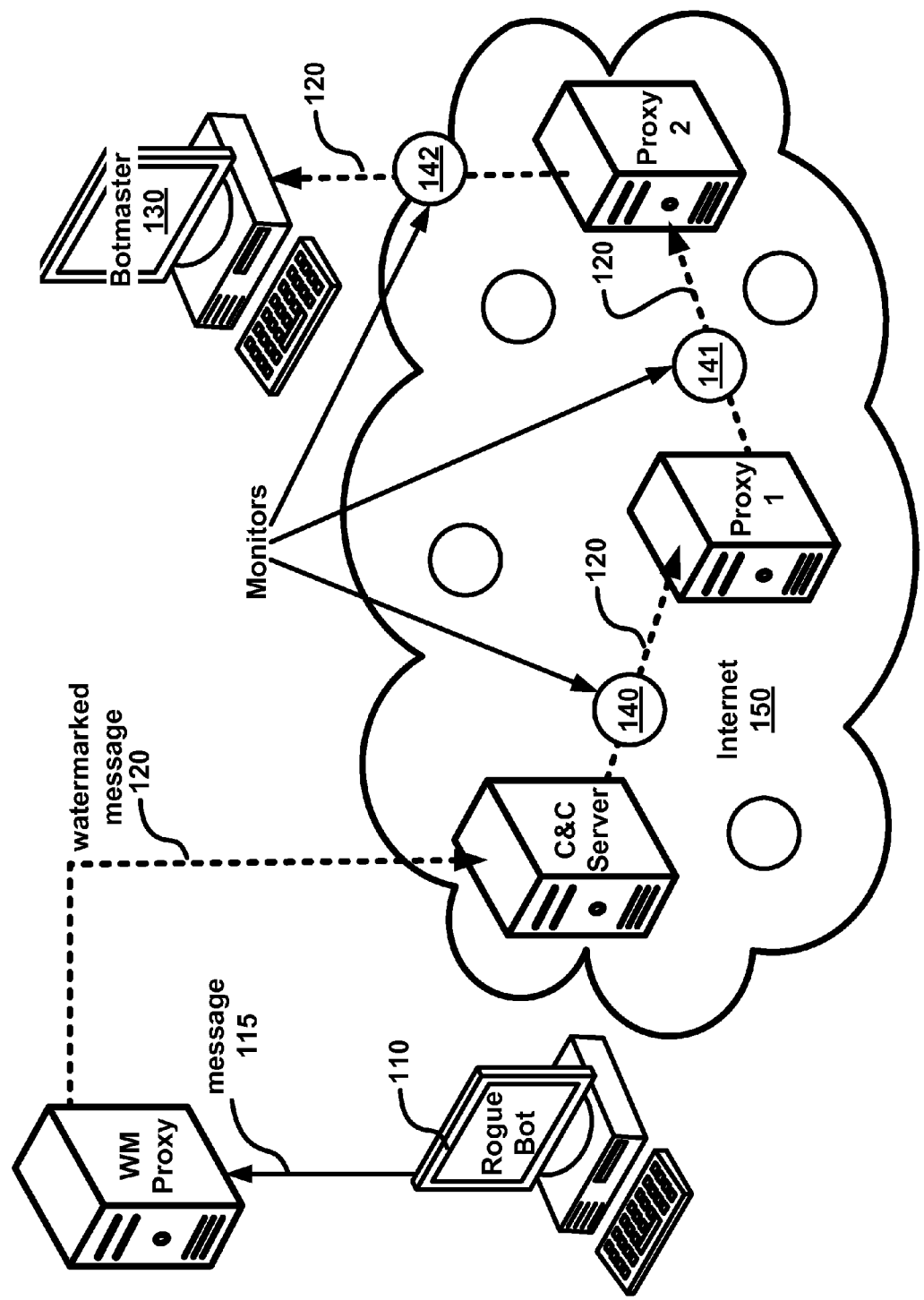
FIG. 1 is a system diagram showing botmaster traceback by watermarking botnet response traffic as per an aspect of an embodiment of the present invention.

Embodiments of the present invention enable real-time botmaster traceback across the Internet. Despite the increasing botnet threat, research in the area of botmaster traceback is limited. The four main obstacles are 1) the low-traffic nature of the bot-to-botmaster link; 2) chains of "stepping stones;" 3) the use of encryption along these chains; and 4) mixing with traffic from other bots. Most existing traceback approaches can address one or two of these issues, but no single approach can overcome all of them. Embodiments of the present invention use a watermarking technique to address all four obstacles simultaneously. The embodiments uniquely identify and trace IRC-based botnet flow even if 1) it is encrypted (e.g., via SSL/TLS); 2); it passes multiple intermediate stepping stones (e.g., IRC server, SOCKs); and 3) it is mixed with other botnet traffic. The watermarking scheme relies on adding padding characters to outgoing botnet C&C messages at the application layer. This produces specific differences in lengths between randomly chosen pairs of messages in a network flow. As a result, the watermarking technique may be used to trace interactive botnet C&C traffic with only a few dozen packets to be effective.

Tracking and locating the botmaster of a discovered botnet is very challenging. First, the botmaster only needs to be online briefly to issue commands or check the bots' status. As a result, any botmaster traceback may have to occur in real time. Second, the botmaster usually does not directly connect to the botnet C&C server and may be able to easily launder his connection through various stepping stones. Third, the botmaster may be able to protect his C&C traffic with strong encryption. For example, Agobot has built-in SSL/TLS support. Finally, the C&C traffic from the botmaster is typically low-volume. As a result, a successful botmaster traceback approach may need to be effective on low-volume, encrypted traffic across multiple stepping stones.

Existing traceback methods cannot effectively track a botmaster across the Internet in real-time. Some methods have been shown to be able to trace encrypted traffic across various stepping stones and proxies, but they need a large amount of traffic (at least hundreds of packets) to be effective. During a typical session, each bot exchanges only a few dozen packets with the botmaster. Due to this low traffic volume, these types of high traffic techniques may not be suitable for botmaster traceback.

Embodiments of the present invention address the botmaster traceback problem with a packet flow watermarking technique. These embodiments provide a practical solution that can be used to trace low-volume botnet C&C traffic in real-time even if it is encrypted and laundered through multiple intermediate hosts (e.g., IRC servers, stepping stones, proxies). Some of the embodiments assume that the tracer has control of a single rogue bot in the target botnet, and that this bot can send messages in response to a query from the botmaster. To trace the response traffic back to the botmaster, the rogue bot transparently injects a unique watermark into its response. Tracing the watermarked response traffic via monitoring nodes across the Internet, one may locate the botmaster.

To embed the watermark, the lengths of randomly selected pairs of packets may be adjusted such that the length difference between each packet pair will fall within a certain range. Some of the disclosed embodiments utilize hybrid length-timing watermarking to track encrypted botnet traffic that mixes messages from multiple bots. These embodiments require far less traffic volume to encode high-entropy watermarks. The effectiveness of some embodiments was empirically validated using real-time experiments on live IRC traffic through PlanetLab nodes and public IRC servers across different continents. Two of the embodiments achieved a virtually 100% watermark detection rate and a $10^{-5}$ false positive rate with only a few dozen packets. This approach has the potential to allow real-time botmaster traceback across the Internet.

Botmaster Traceback Model:

Because most botnets currently in the wild are IRC-based, disclosed embodiments focus on tracing the botmaster in the context of IRC-based botnets. Nevertheless, one skilled in the art will recognize that the disclosed flow watermarking trace approach is applicable to any interactive botnet traffic.

Botnets and Stepping Stones

Bots have been covered extensively in the existing literature. The typical bot lifecycle starts with exploitation, followed by download and installation of the bot software. At this point, the bot contacts the central C&C server run by the botmaster, where botmaster can execute commands and receive responses from his botnet.

Botmasters rarely connect directly to their C&C servers since this would reveal their true IP address and approximate location. Instead, they use a chain of stepping stone proxies that anonymously relay traffic. Popular proxy software used for this purpose is SSH, SOCKS, and IRC BNCs (such as psyBNC). Since the stepping stones are often controlled by the attacker, they may not have an audit trail in place or other means of tracing the true source of traffic. However, there are two properties of stepping stones that can be exploited for tracing purposes: 1) the content of the message (the application-layer payload) is not modified and 2) messages are passed on immediately due to the interactive nature of IRC. Consequently, the relative lengths of messages and their timings are preserved, even if encryption is used. In the case of encryption, the message lengths may be rounded up to the nearest multiple of the block size.

Tracking the Botmaster by Watermarking Botnet Traffic

Botmaster traceback embodiments exploit the fact that the communication between the IRC-based bots and the botmaster is bidirectional and interactive. Whenever the botmaster issues commands to a bot, the response traffic will eventually return to the botmaster after being laundered and possibly transformed. Therefore, if the response traffic from a bot to the botmaster can be watermarked, one can eventually trace and locate the botmaster. Since the response traffic being tracked may be mixed with other IRC traffic, the target traffic may need to be able to be isolated. With unencrypted traffic, this can be achieved by content inspection, but encrypted traffic presents a challenge which may be addressed with a hybrid length-timing algorithm.

FIG. 1 is system diagram showing a botmaster traceback model that watermarks botnet response traffic. This diagram assumes control of a rogue bot 110, which could be a honeypot host that has been compromised and has joined a botnet. The rogue bot 110 watermarks its outgoing private message (PRIVMSG) traffic 115 in response to commands from the botmaster 130. As with any traceback approach, the watermark tracing scheme needs support from the network 150. Network support could come from, for example, cooperating monitor nodes (140-142) across the Internet 150, which will inspect the passing traffic for specified watermark(s) in the watermarked message 120 and report back whenever they find it. Note that this approach does not require a global monitoring capability. If there are uncooperative or unmonitored areas, one or more links along the traceback path might be lost. However, the trail may be picked up again once the watermarked traffic re-enters a monitored area. In general, this approach should handle the absence of a global monitoring capability. The tracer may share the desired watermark with all monitor nodes prior to sending the watermarked traffic 120. In some embodiments, the sharing may be secure. This enables the monitors to report 'sightings' of the watermark in real-time and may require only a single watermarked flow 120 to complete a trace.

Length-Based Watermarking Scheme

The disclosed watermarking scheme is particularly useful for a low-traffic, text-based channel such as the one between a bot and its botmaster. The design and analysis of both the length-only (unencrypted traffic) and the length-timing hybrid algorithms (encrypted traffic) will be described. Example encoding and decoding formulas for both algorithms are disclosed. The issue of false positives and false negatives will then be addressed.

The terms 'message' and 'packet' are used interchangeably since a typical botnet C&C message is usually small (less than 512 bytes) and mat fit into a single packet.

Basic Length-Based Watermarking Scheme

Watermark Bit Encoding: Given a packet flow f of n packets $P_1; : : : ; P_n$, it is desired to encode an l-bit watermark $W=w_0; : : : ; w_{l-1}$ using $2l \leq n$ packets. A pseudo-random number generator (PRNG) with seed s may be used to randomly choose 2l distinct packets from $P_1; : : : ; P_n$. The 2l packets may be used to form l packet pairs: $\langle P_{r_i}, P_{e_i} \rangle$ (i=0, . . . l−1) such that $r_i \leq e_i$. In some embodiments this pairing may be done with randomly selected packets. In this description, packet $P_{r_i}$ is called a reference packet and packet $P_{e_i}$ is called an encoding packet. The PRNG may be used to randomly assign watermark bit $w_k$ ($0 \leq k \leq l-1$) to packet pair $\langle P_{r_i}, P_{e_i} \rangle$. $\langle r_i, w_i, k \rangle$ is used here to represent that packet pair $\langle P_{r_i}, P_{e_i} \rangle$ is assigned to encode watermark bit $w_k$.

To encode the watermark bit $w_k$ into packet pair $\langle P_{r_i}, P_{e_i} \rangle$ the length of the encoding packet $P_{e_i}$ may be modified by adding padding characters to achieve a specific length difference to its corresponding reference packet $P_{r_i}$. The padding characters could be invisible (such as whitespace) or visible characters and they can be inserted in random locations within the message. This would make it difficult for the adversary to detect the existence of the padding. Let $l_e$ and $l_r$ be the packet lengths of the watermark encoding and reference packets respectively, $Z=l_e-l_r$ be the length difference, and $L>0$ be the bucket size. The watermark bit encoding function is defined as:

$$e(l_r,l_e,L,w)=l_e+[(0.5+w)L-(l_e-l_r)] \bmod 2L \quad (1)$$

which returns the increased length of watermark encoding packet given the length of the reference packet $l_r$, the length of the encoding packet $l_e$, the bucket size L, and the watermark bit to be encoded w.

Therefore, $$(e(l_r, l_e, L, w) - l_r) \bmod 2L = \left\{(l_e - l_r) + \left[\frac{(0.5+w)L-}{(l_e-l_r)}\right] \bmod 2L\right\} \bmod 2L \quad (2)$$
$$= \left\{(l_e - l_r) + \left[\frac{(0.5+w)L-}{(l_e-l_r)}\right] \bmod 2L\right\} \bmod 2L$$
$$= \{(0.5+w)L\} \bmod 2L$$
$$= (w+0.5)L$$

This indicates that the packet length difference $Z=l_e-l_r$, after $l_e$ is adjusted by the watermark bit encoding function $e(l_r, l_e, L, w)$, falls within the middle of either an even or odd numbered bucket depending on whether the watermark bit w is even or odd.

Watermark Bit Decoding:

Assuming the decoder knows the watermarking parameters: PRNG, s, n, l, W and L, the watermark decoder can obtain the exact pseudo-random mapping $\langle r_i, e_i, k \rangle$ as that used by the watermark encoder. The following watermark bit decoding function may be used to decode watermark bit $w_k$ from the packet lengths of packets $P_{r_i}$ and $P_{e_i}$:

$$d(l_r, l_e, L) = \left\lfloor \frac{l_e - l_r}{L} \right\rfloor \bmod 2 \quad (3)$$

The equation below proves that any watermark bit w encoded by the encoding function defined in equation (1) will be correctly decoded by the decoding function defined in equation (3).

$$d(l_r, e(l_r, l_e, L, w), L) = \left\lfloor \frac{e(l_r, l_e, L, w) - l_r}{L} \right\rfloor \bmod 2 \quad (4)$$
$$= \left\lfloor \frac{(l_e-l_r) \bmod 2L + [(0.5+w)L-(l_e-l_r)] \bmod 2L}{L} \right\rfloor \bmod 2$$
$$= \left\lfloor \frac{(0.5+w)L}{L} \right\rfloor \bmod 2$$
$$= w$$

Assume the lengths of packets $P_r$ and $P_e$ ($l_r$ and $l_e$) have been increased for $x_r \geq 0$ and $x_e \geq 0$ bytes respectively when they are transmitted over the network (e.g., due to padding of encryption), then $x_e-x_r$ is the distortion over the packet length difference $l_e-l_r$. Then the decoding with such distortion is:

$$d(l_r+x_r, e(l_r, l_e, L, w)+x_e, L) = \left\lfloor \frac{e(l_r, l_e, L, w)-l_r+(x_e-x_r)}{L} \right\rfloor \bmod 2 \quad (5)$$

-continued
$$= w + \left\lfloor 0.5 + \frac{x_e - x_r}{L} \right\rfloor \bmod 2$$

Therefore, the decoding with distortion will be correct if and only if:

$$(-0.5+2i)L \geq x_e-x_r < (0.5+2i)L \quad (6)$$

Specifically, when the magnitude of the distortion $|x_e-x_r|<0.5$ L, the decoding is guaranteed to be correct.

Watermark Decoding and Error Tolerance

Given a packet flow f and appropriate watermarking parameters (PRNG, s, n, l, W and L) used by the watermark encoder, the watermark decoder can obtain a l-bit decoded watermark W' using the watermark bit decoding function defined in equation (3). Due to potential distortion of the packet lengths in the packet flow f, the decoded W' could have a few bits different from the encoded watermark W. A Hamming distance threshold $h \geq 0$ is introduced here to accommodate such partial corruption of the embedded watermark. Specifically, packet flow f will be considered to contain watermark W if the Hamming distance between W and W': H(W, W') is no bigger than h.

Watermark Collision Probability (False Positive Rate)

No matter what watermark W and Hamming distance threshold h is chosen, there is always a non-zero possibility that the decoding W' of a random unwatermarked flow happens to have no more than h Hamming distance to the random watermark W chosen. In other words, watermark W is reported to be found in an unwatermarked flow. This case is referred to as a watermark collision.

Intuitively, the longer the watermark and the smaller the Hamming distance threshold, the smaller the probability of a watermark collision. Assuming a randomly chosen a l-bit watermark, and l-bits decoding from random unwatermarked flows, any particular bit decoded from a random unwatermarked flow should have 0.5 probability to match the corresponding bit of the random watermark chosen. Therefore, the collision probability of l-bit watermark from random unwatermarked flows with Hamming distance threshold h is:

$$\sum_{i=0}^{h} \binom{l}{i}\left(\frac{1}{2}\right)^l \quad (7)$$

The watermark collision probability distribution was empirically validated with the following experiment. First a PRNG and a random seed number s was used to generate 32 packet pairs $\langle r_i, e_i \rangle$ and pseudo-randomly assign each bit of a 32-bit watermark W to the 32 packet pairs, we then encode the 32 bit watermark W into a random packet flow f. An attempt was then made to decode the watermarked flow f' with 1,000 wrong seed numbers. Given the pseudo-random nature of the selection of packet pairs, decoding a watermarked flow with the wrong seed is equivalent of decoding an unwatermarked flow, which can be used to measure the watermark collision probability.

Figure 2A:
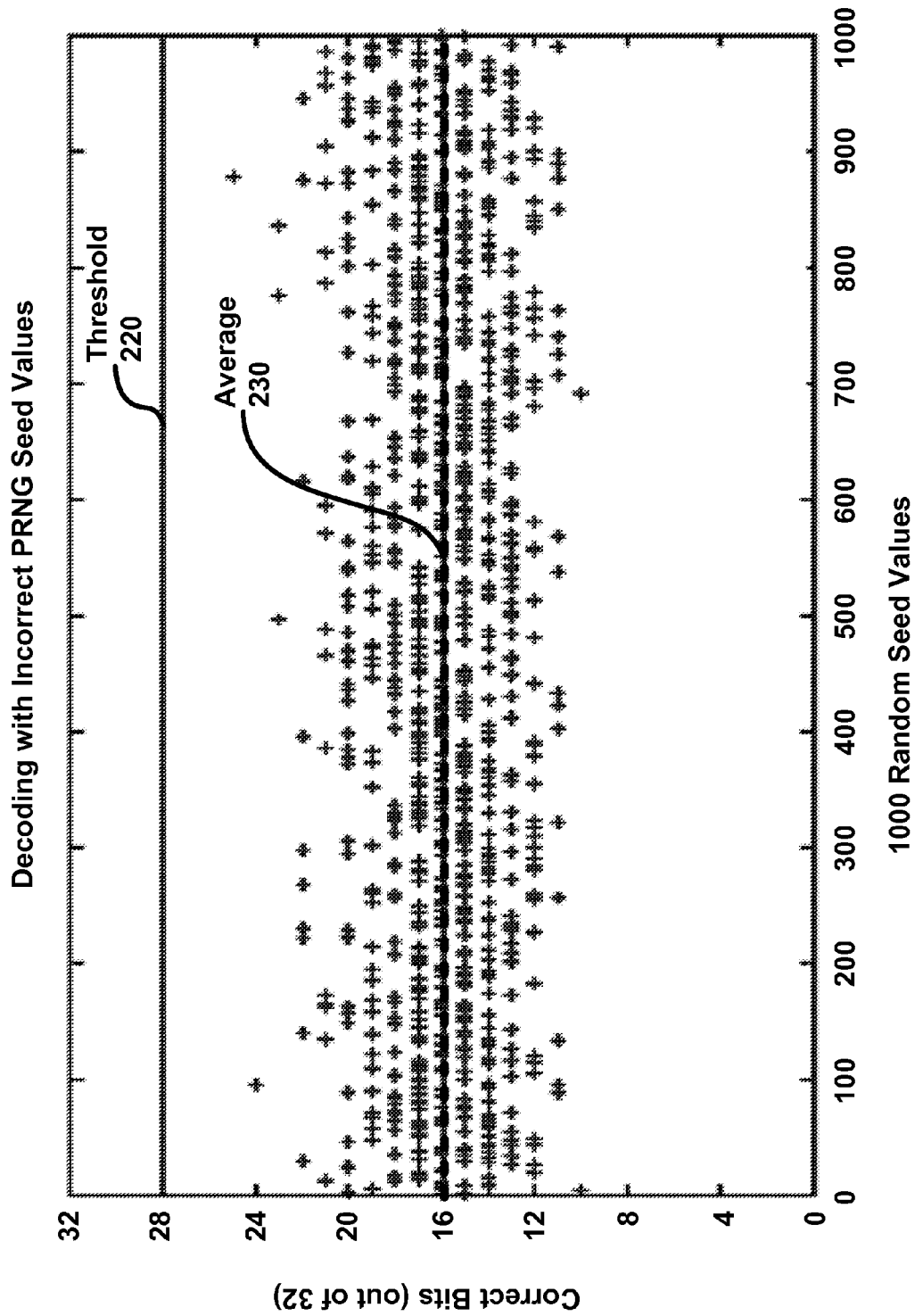
FIG. 2A is a plot of 32-bit watermark collision probability plot for an aspect of an embodiment of the present invention.
Figure 2B:
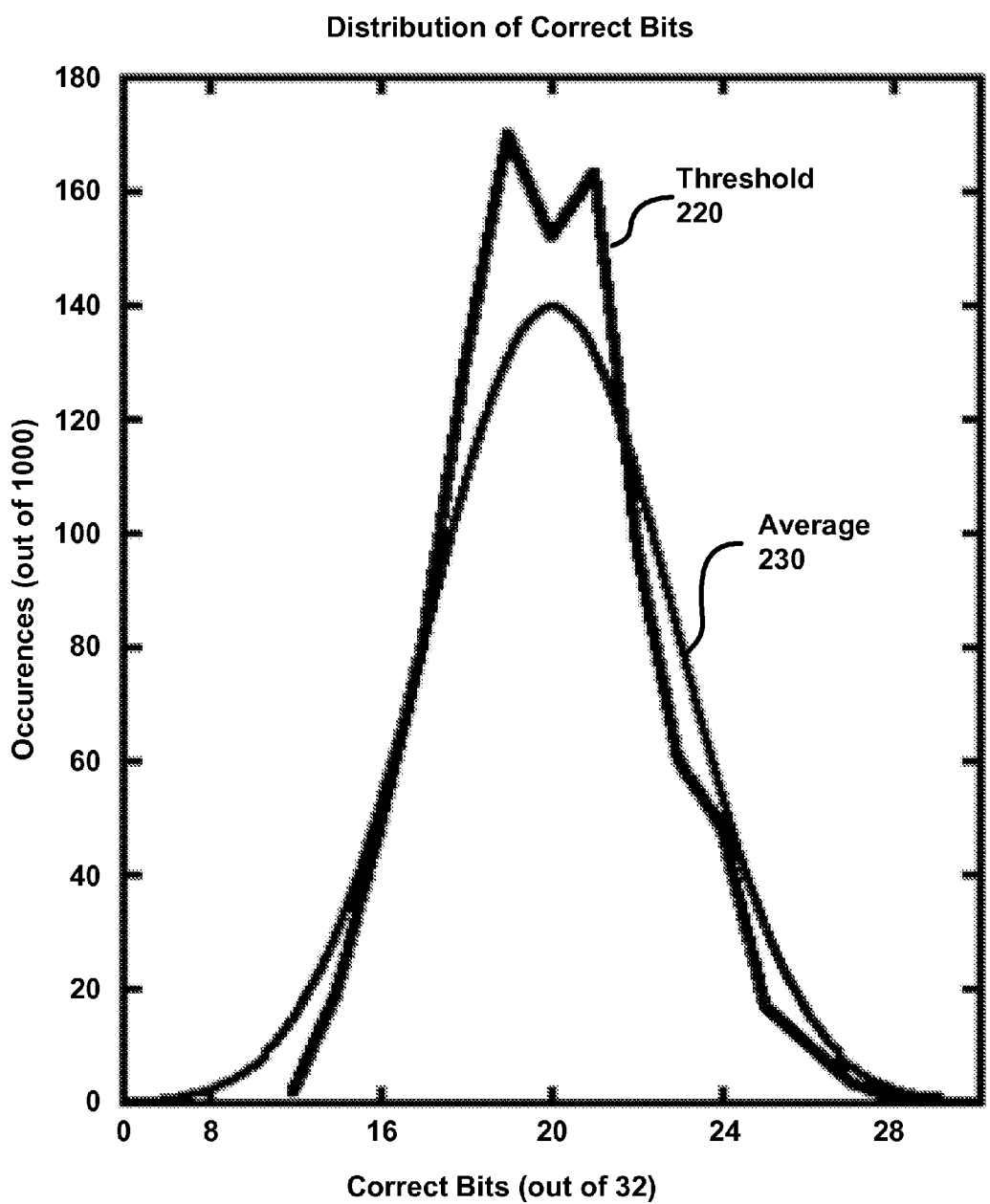
FIG. 2B is a plot of 32-bit watermark collision distribution plot for an aspect of an embodiment of the present invention.

FIG. 2A illustrates the number of matched bits from the decoding with each of the 1,000 wrong seed numbers. It shows that the numbers of matched bits are centered around the expected value of 16 bits, which is half of the watermark length. Based on these results and the experimental data, a Hamming distance threshold of h=4 (28 bits) was chosen as shown on the graph, yielding an expected false positive rate (FPR) of $9.64 \times 10^{-6}$ according to equation (7). The average 230 and threshold 220 are shown in this graph. FIG. 2B shows the distributions of the measured and the expected number of matched bits. The graph illustrates that the distribution of the measured number of matched bits is close to the expected binomial distribution with p=0.5 and n=32.

Watermark Loss (False Negative)

The length-only encoding scheme (with-out the hybrid timing approach) is highly sensitive to having the correct sequence of messages. If any messages are added or deleted in transit, the watermark may be lost in that flow. However, the chance of this happening is very remote since the encoding takes place at the application layer, on top of TCP. By its nature, TCP guarantees in-order delivery of all packets and their contents, so a non-intentional watermark loss is very unlikely. One skilled in the art will also recognize that this scheme may also be used in other types of packet traffic such as in unreliable traffic such as UDP.

In the case of active countermeasures, the scheme can tolerate distortion as long as $|x_e - x_r| < 0.5$ L, as described by inequality (6). This property is the result of aiming for the center of each bucket when encoding. However, if an active adversary drops, adds, or reorders messages, the watermark may be lost unless additional redundancy is in place or the length-timing algorithm is used.

Hybrid Length-Timing Watermarking for Encrypted Traffic:

By their nature, IRC-based botnets have many bots on one channel at once, many of them joining, parting, or sending data to the botmaster simultaneously. In this case, the watermarked messages from a rogue bot may be mixed with unwatermarked messages from other bots. These unwatermarked messages from others are called chaff messages. In order to reliably decode the embedded watermark, chaff messages may need to be filtered out as much as possible.

When the C&C traffic is unencrypted, it may be easy for the watermark decoder to filter out chaff based on the sender nicks in the messages. However, if the traffic is encrypted (e.g., using SSL/TLS), content inspection may not be relied upon to identify chaff messages. To address this new challenge in filtering out chaff, use of another dimension of information—the packet timing—to filter out chaff may be used.

The basic idea is to send the watermark encoding packets at a specific time (e.g., $t_i$). Assuming the network jitter $\delta$ is limited, the range of potential packets used for decoding may be narrowed to $$\left[ t_{e_i} - \frac{\delta}{2}, t_{e_i} + \frac{\delta}{2} \right].$$

If $\delta > 0$ is small, then the chances that some chaff packet happens to fall within the range $$\left[ t_{e_i} - \frac{\delta}{2}, t_{e_i} + \frac{\delta}{2} \right]$$

is small. This means the watermark may be decoded correctly even if there are substantial encrypted chaff packets.

Hybrid Length-Timing Watermark Encoding

The hybrid length-timing watermark bit encoding process is basically the same as that of the length-based watermarking scheme. The difference is that with hybrid length-timing watermarking, each watermarked packet $P_{e_i}$ is sent out at a precise time. Specifically, the watermark bit encoding function defined in equation (1) may be used to adjust the length of the watermark encoding packet $P_{e_i}$. A pseudo-random number generator PRNG and seed $s_t$ may be used to generate the random time $t_{e_i}$ at which $P_{e_i}$ be sent out.

An implicit requirement for this hybrid length-timing watermarking scheme is that one may need to know when each watermark encoding packet $P_{e_i}$ will be available. In the watermark tracing model, the tracer owns a rogue bot who can determine what to send out and when to send it. Since there is full control over the outgoing traffic, the hybrid length-timing scheme may be used to watermark the traffic in real-time.

Watermark Decoding

When decoding the encrypted botnet traffic, it may not be possible to know which packet is a watermark encoding packet $P_{e_i}$. However, given the PRNG and $s_t$, the approximate time $t_{e_i}$ at which the watermark encoding packet $P_{e_i}$ should arrive is know. All packets in the time interval $$\left[ t_{e_i} - \frac{\delta}{2}, t_{e_i} + \frac{\delta}{2} \right]$$

may be used to decode the watermark. Specifically, the sum of the lengths of all the packets in the time interval $$\left[ t_{e_i} - \frac{\delta}{2}, t_{e_i} + \frac{\delta}{2} \right]$$

may be used as the length of the watermark encoding packet and applied to the watermark bit decoding function (3).

Due to network delay jitter and/or active timing perturbation by the adversary, the exact arrival time of watermark encoding packet $P_{e_i}$ may be different from $t_{e_i}$. Fortunately, the decoding can self-synchronize with the encoding by leveraging an intrinsic property of the hybrid length-timing watermarking scheme. Specifically, if the decoding of a watermarked flow uses the wrong offset or wrong seeds (s and $s_t$), then the decoded 1-bit watermark W' will almost always have about 1/2 bits matched with the true watermark W. This provides a way to determine if the correct offset is being used. A range of possible offsets may be attempted the best decoding result selected for use.

Implementation and Experiment

To validate the practicality of our watermarking scheme, both the length-only algorithm (unencrypted traffic) and the length-timing hybrid algorithm (encrypted traffic) were implemented. To let our watermarking proxy interact with a realistic but benign IRC bot, a sanitized version of Agobot was obtained from its source code, containing only benign IRC communication features. The sanitized Agobot was run on a local machine to generate benign IRC traffic to test the effectiveness of the watermarking scheme across public IRC servers and PlanetLab nodes. At no time was malicious traffic sent to anyone in the course of the experiments.

Length-Only Algorithm (Unencrypted Traffic)

The length-only algorithm was implemented in a modified open-source IRC proxy server and a series of experiments were run using the sanitized Agobot and public Internet IRC servers. The watermark successfully recovered from unencrypted traffic in all ten of the trials.

Modified IRC Bouncer

To achieve greater flexibility, the watermarking functionality was added to an existing IRC bouncer (BNC) package, psyBNC. Having the watermarking implemented on a proxy server allows all bots conforming to the standard IRC protocol to be used. It eliminated the need to have access to a bot's source code to add the watermarking functionality: outgoing traffic was modified by the BNC after the bot sent it.

In order for psyBNC to act as a transparent proxy, it needs to be configured identically to the bot. The information required consists of the C&C server's hostname, the port, and an IRC nick consistent with the bot's naming scheme. This information can be gathered by running the bot and monitoring the outgoing network traffic. In order to trick the bot into connecting to the BNC rather than to the real C&C host, the local DNS cache may need to be updated so that a lookup of the C&C server's hostname resolves to the IP of the BNC.

Once it has been configured with this information, the BNC should be completely transparent to the bot: when it starts up, the bot is automatically signed into the real C&C server by the BNC. The bot now joins the botnet channel as if it was directly connected and then waits for the botmaster's instructions. All PRIVMSG traffic from the bot to the C&C server (and by extension, to the botmaster) is watermarked by the transparent BNC in between.

Experiment and Results

Figure 3:
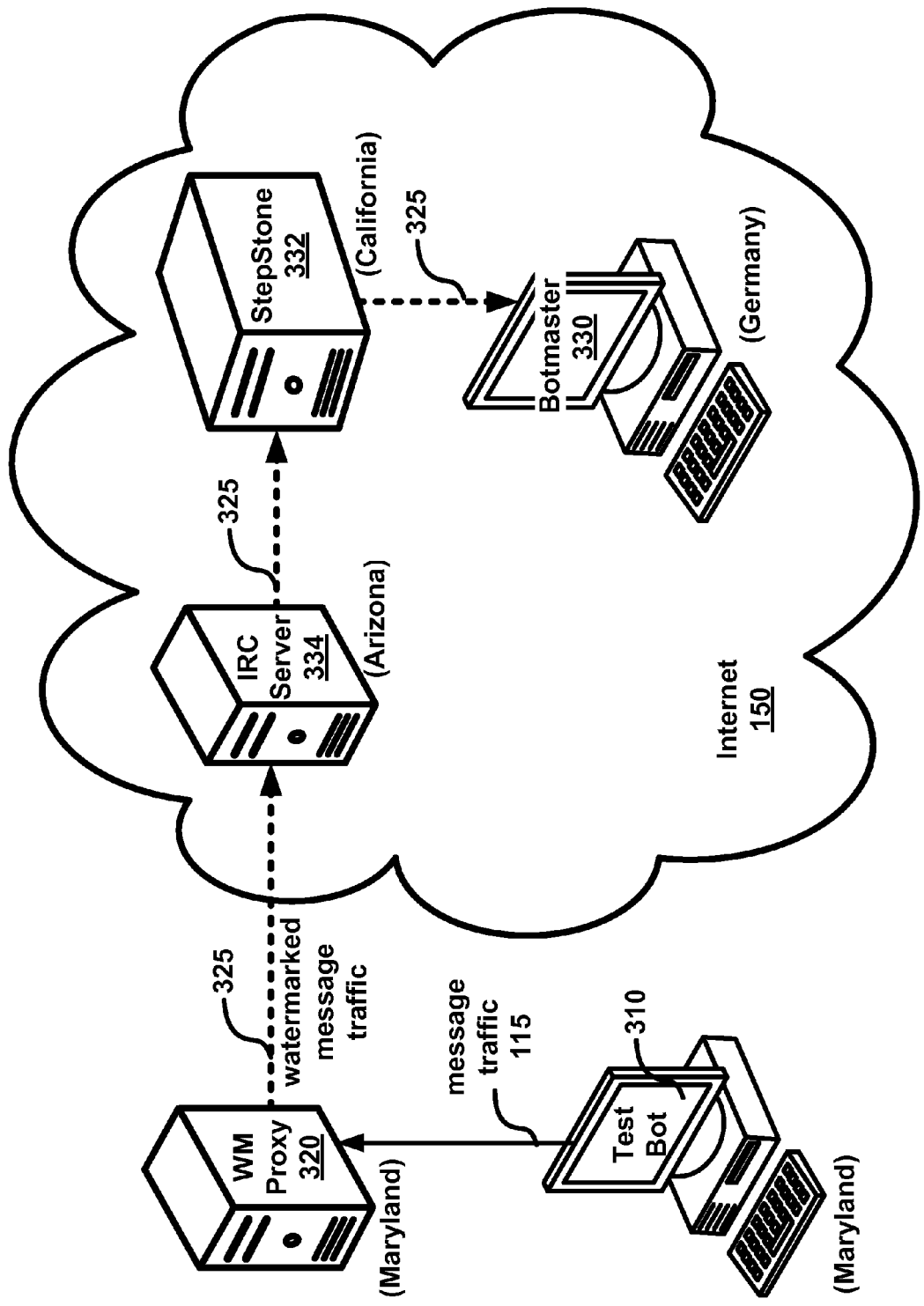
FIG. 3 is a block diagram of an experimental setup of an aspect of an embodiment of the present invention for unencrypted traffic.

To test the watermarking scheme, an experiment was devised that emulates the conditions of an Internet-wide botnet as closely as possible. FIG. 3 is a block diagram of the experimental setup. To simulate the botmaster 330 and stepping stones, PlanetLab nodes in California 332 and Germany 330 were used. A live, public IRC server in Arizona 334 was used to act as a C&C host, creating a uniquely-named channel for the experiments. The channel consisted of two IRC users: the Test Bot 310 was running a copy of the sanitized Agobot and the Botmaster 330 was acting as the botmaster. As the diagram indicates, all traffic 315 sent by the Test Bot 310 passes through the psyBNC server (WM Proxy 320) where the watermark is injected. The distances involved in this setup are considerable: the watermarked traffic 325 traverses literally half the globe (12 time zones) before reaching its ultimate destination in Germany, with a combined round-trip time of 292 milliseconds on average (at the time of our experiment).

The objective is to be able to decode the full watermark in the watermarked traffic 325 captured at the Stepping Stone 332 and Botmaster 330. Since only PRIVMSG traffic from the Test Bot 310 is watermarked, all other traffic (chaff) is filtered out before decoding. Most of this chaff consists of messages from other users on the channel, PING/PONG exchanges, and JOIN/PART notifications from the channel. There could be additional chaff on the same connection if the botmaster 330 is logged into multiple channels on the same IRC server 334. However, filtering out the chaff is trivial in the absence of encryption since all IRC messages contain the sender's nick. Therefore, the watermarked packets may be isolated based on the Test Bot's nick.

During our experiments, the psyBNC proxy 320 was configured to inject a 32-bit watermark into a 64-packet stream 315. To generate traffic 315 from the Test Bot 310, the Botmaster 330 logged in and issued the commands.list command, causing the test bot 310 to send a list of all valid bot commands and their descriptions. All traffic leaving the WM Proxy 325 was captured, arriving at the Stepping Stone 332, and arriving at the Botmaster 330. In ten trials with different (random) 32-bit watermarks, the full 32-bit watermark at all three monitoring locations: the WM Proxy 325 in Maryland, the Stepping Stone 332 in California, and Botmaster 330 in Germany were decoded correctly.

Hybrid Length-Timing Algorithm (Encrypted Traffic)

To test the hybrid length-timing algorithm, we implemented a simple IRC bot that sends length-watermarked messages out at specific intervals. We used a "chaff bot" on the channel to generate controlled amounts of chaff. We were able to recover the watermark with a high success rate, even when high amounts of chaff were present.

Hybrid Length-Timing Encoder

The hybrid encoding algorithm as implemented as a Perl program which reads in a previously length-only watermarked stream of messages and sends them out at specific times. To achieve highly precise timing, the Time::HiRes Perl package was used, which provides microsecond-resolution timers. At startup, the program uses the Mersenne Twister PRNG (via the Math::Random::MT package) to generate a list of departure times for all messages to be sent. Each message is sent at a randomly chosen time between 2 and 2.35 seconds after the previous message. The 2-second minimum spacing avoids IRC server packet throttling (discussed later).

Hybrid Length-Timing Decoder

Figure 4:
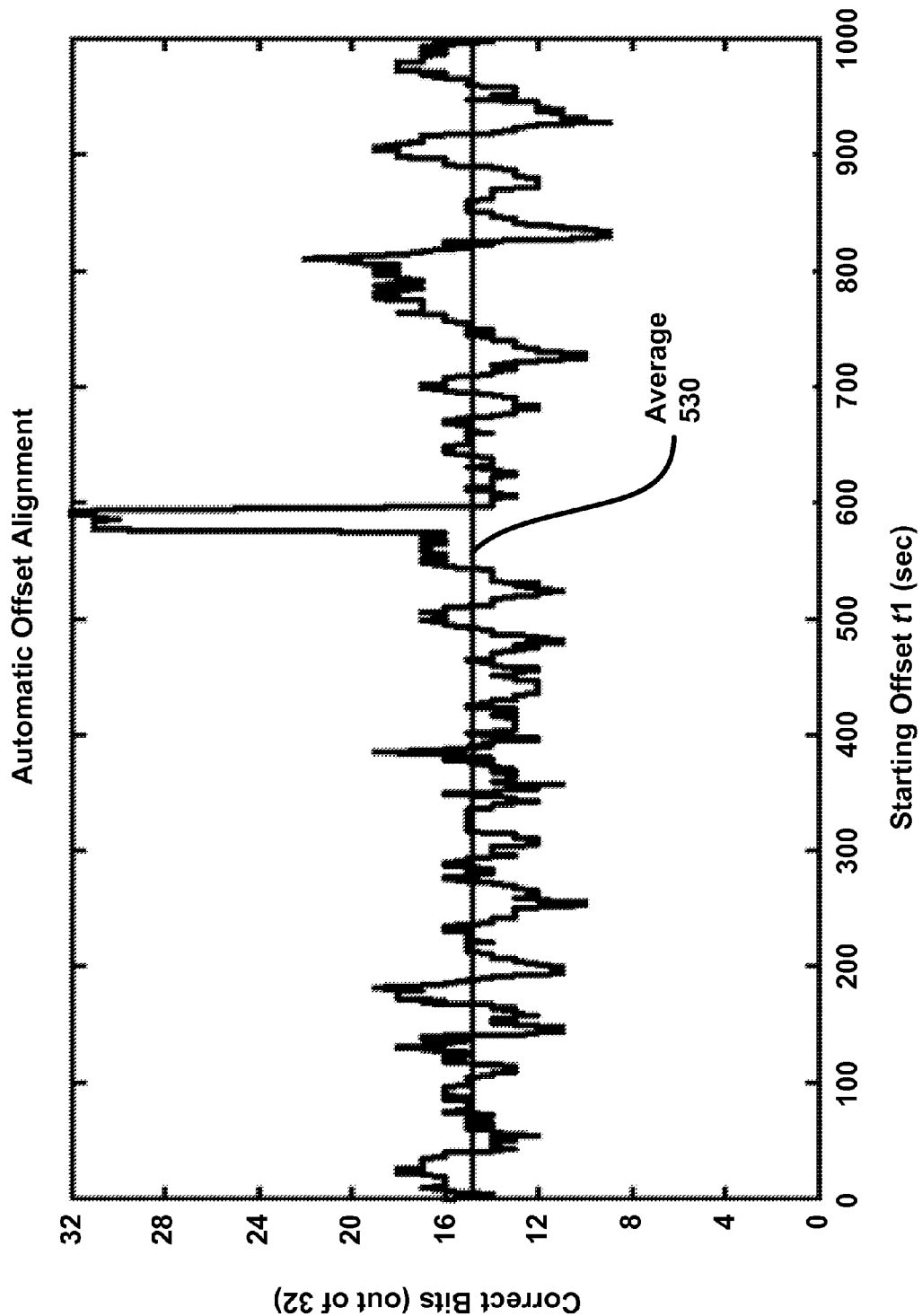
FIG. 4 is a plot showing offset self-synchronization using an offset sliding-window as per an aspect of an embodiment of the present invention for unencrypted traffic.

The hybrid decoding script was also written in Perl, relying on the PCAP library to provide a standardized network traffic capture mechanism (via the Net::Pcap module). The program reads in a stream of packets (either from a live interface or from a PCAP file), then performs a sliding-window offset self-synchronization process to determine the time $t1$ of the first watermarked packet. To find the correct $t1$, the program steps through a range of possible values determined by the offset, max, and step parameters. It starts with $t1$=offset, incrementing $t1$ by step until $t1$=(offset+max). It decodes the full watermark sequence for each $t1$, recording the number of bits matching the sought watermark W. It then chooses the $t1$ that produced the highest number of matching bits. If there are multiple $t1$ values resulting in the same number of matching bits, it uses the lowest value for $t1$. FIG. 4 illustrates the synchronization process, showing that the correct $t1$ is near 6 seconds: 5.92 sec has 32 correct bits. For all incorrect $t1$ values, the decoding rate was significantly lower, averaging 14.84 correct bits (530).

Experiment and Results

Figure 5:
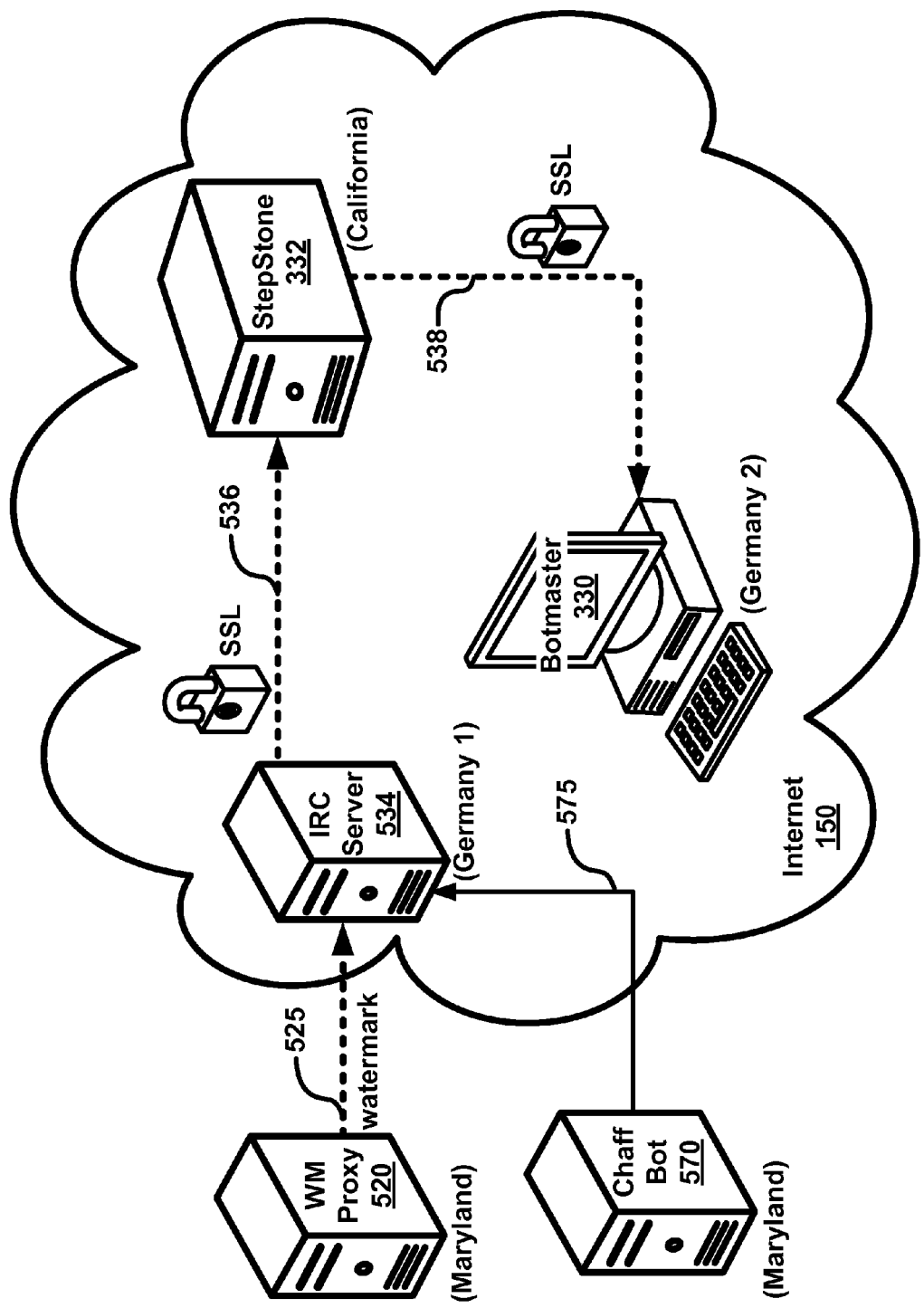
FIG. 5 is a block diagram of an experimental setup of an aspect of an embodiment of the present invention for encrypted traffic.

The experiment setup in this case was similar to the unencrypted experiment described earlier and is shown in FIG. 5. The three main differences were: 1) a single Source computer 520 producing watermarked traffic 525 on its own replaced the Test Bot 310 and WM Proxy 320; 2) the connection between the Botmaster 330 and the IRC server 534 (via StepStone 332) was encrypted using SSL/TLS; and 3) a different IRC server 534 was used because the one in Arizona 334 does not support SSL/TLS connections. The IRC server 534 in this case happens to be located in Germany, not in the same place as the Botmaster. FIG. 5 shows the experiment setup. In this configuration, the distances involved are even greater, with the watermarked traffic 525 traversing the equivalent of the entire globe (24 time zones). The combined round-trip time from Source 525 to Botmaster 330 was 482 milliseconds (on average) at the time of the experiment.

To handle encryption, the parameters for the length-only algorithm were adjusted to ensure that the bucket size matched or exceeded the encryption block size. Most SSL/TLS connections use a block size of 128 bits (16 bytes), though 192 and 256 bits are also common. To ensure that each added bucket also causes another encrypted block to be added to the message, the bucket size has to be greater than or equal to the block size. For this experiment, a bucket size of 16 bytes was used, which was sufficient for the 128-bit block size used in the SSL/TLS connection. For compatibility with the larger block sizes (192 and 256 bits), a bucket size of 32 bytes can be used, etc.

For the experiments, the Source 520 produced a stream of 64 packets 525, containing a randomly generated 32-bit watermark. The Chaff Bot 570 produced a controlled amount of background traffic 575, spacing the packets at random intervals between 1 and 6 seconds (at least 1 second to avoid throttling). In addition to the Control run (no chaff), five different chaff levels (Chaff 1 to 5) were run. The number refers to the maximum time between packets (not including the minimum 1-second spacing). For example, for the Chaff 1 run, packets were sent at a random time between 1 and 2 seconds. Thus, one packet was sent on average every 1.5 seconds, resulting in a chaff rate of approximately 1=1:5=0: 667 packets/sec.

Network traffic was captured in three places: 1) traffic 575 & 525 from Source 525 and Chaff Bot 570 to IRC Server 534; 2) traffic 536 arriving at StepStone 332 from IRC Server 534; and 3) traffic 538 arriving at Botmaster 330 from StepStone 332. Traffic in all three locations includes both watermark and chaff packets. The traffic was decoded at each location, recording the number of matching bits. For decoding, a value of 200 milliseconds was used for the timing window size 8 and a sliding offset range from 0 to 10 seconds. This $\delta$ value was large enough to account for possible jitter along the stepping stone chain but small enough to make it unlikely that a chaff packet appears within $\delta$ of an encoding packet. The actual chaff rate based on the departure times of each chaff packet was also measured, and these were very close to the expected rates based on an even distribution of random departure times. This process was repeated three times for each chaff level, resulting in a total of 18 runs. Experiment results are summarized in the table in FIG. 6, with each column representing the average values from three trials.

The decoding along the stepping-stone chain for all chaff rates of 0.5 packets/sec and below were near-perfect. Only when the chaff rate rose above 0.5 packets/sec did the chaff start having a slight impact, bringing the decoding rate down to an average of 31 bits. The overall average decoding rate at the StepStone 332 and Botmaster 330 was 31.69 bits, or 99.05 percent. The lowest recorded decoding rate during the experiments was 28 bits, so that a Hamming distance threshold of h=4 could be used to obtain a 100 percent true positive rate (TPR) and a false positive rate (FPR) of $9.64 \times 10^{-6}$.

Figure 7:
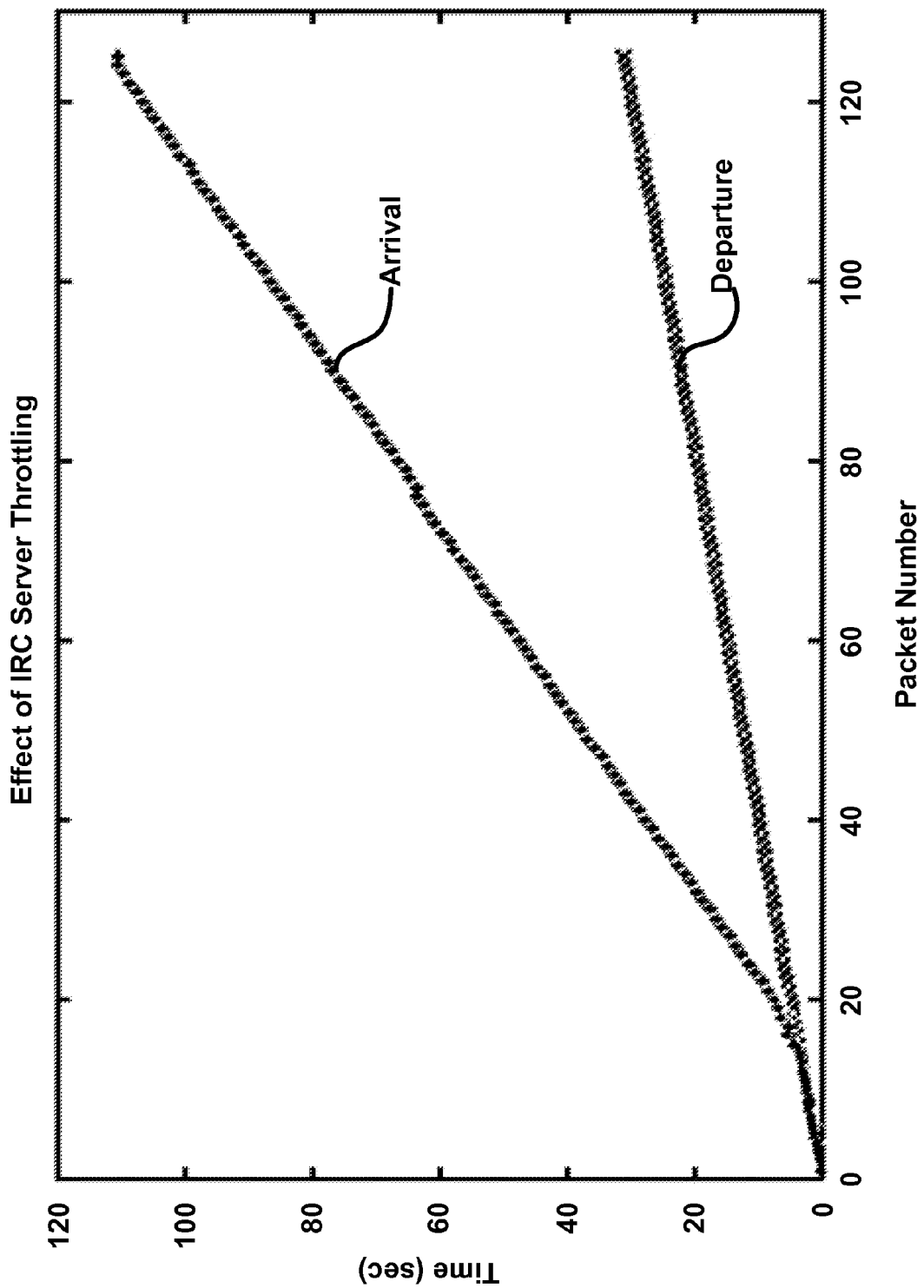
FIG. 7 is a plot showing how IRC server throttling causes packets to be spaced apart further upon arrival using an aspect of an embodiment of the present invention.

The most surprising result is that in all cases where chaff was present, the decoding rate was worse at the Source than downstream at the StepStone 332 and Botmaster 330. After examining the network traces in detail, it was realized that this behavior was due to the presence of traffic queuing and throttling on the IRC Server 534. To avoid flooding, IRC servers are configured to enforce minimum packet spacings, and most will throttle traffic at 0.5 to 1 packets/sec. To confirm this behavior, packets were sent to the IRC Server 534 in Germany at random intervals of 100 to 300 milliseconds. For the first 5 seconds, packets were passed on immediately, but after that the throttling kicked in, limiting the server's outgoing rate to 1 packet/sec. After about 2 minutes, the server's packet queue became full with backlogged packets, and it disconnected the client. FIG. 7 illustrates the effect of throttling on the packet arrival times, including the 5-second "grace period" at the beginning.

In the context of the hybrid encoding scheme, IRC message queuing is highly beneficial because it dramatically reduces the chances that chaff 575 and encoding packets 525 will appear close to each other. At the Source, packets appear at the exact intervals they are sent, which could be less than $\delta$ and therefore affect decoding. However, this interval will be increased due to queuing by the IRC server 534. By the time the packets reach the StepStone 332 and Botmaster 330, they no longer affect decoding because they are more than $\delta$ apart. In the experiments, it was observed that the IRC server 534 introduced a distance of at about 130 milliseconds between packets due to queuing. Since the $\delta$ value was 200 milliseconds, this made it unlikely that two packets would arrive in the same slot.

Discussion

The experiments show that embodiments of the disclosed watermarking scheme is effective in tracing the botmaster of IRC-based botnets, which are still the predominant type in the wild. The watermark can be recovered with a high degree of accuracy even when the watermarked botnet C&C traffic is encrypted across multiple stepping stones and mixed with other flows.

In theory, embodiments of the flow watermarking technique could be applied to trace any realtime and interactive botnet C&C traffic. Therefore, it could be used to track the botmaster of peer-to-peer (P2P) botnets which have started appearing recently. However, HTTP-based botnets present a much higher level of traceback difficulty: the messages do not get passed from the bot to the botmaster in realtime. They are typically stored on the C&C server until the botmaster retrieves them in bulk, usually over an encrypted connection such as SSH. Due to this, any approach that relies on properties of individual packets (such as length and timing) may be unsuccessful.

Once the botmaster become aware of the flow watermarking tracing approach, he may want to corrupt the embedded watermark from intermediate stepping stones. However, since the padding characters could be almost any character and they are inserted randomly in the botnet message, it would be difficult for any intermediate stepping stone to identify and remove the padding characters without knowing the original unwatermarked message. The botmaster may be able to detect and identify the padding if he knows exactly what he is expecting for. However, once he receives the watermarked message, the watermarked message has already left the complete trail toward the botmaster. The botmaster could have intermediate stepping stones to perturb the length of the passing botnet messages by adding random padding such as white space. Since the watermark is embedded in the length difference between randomly chosen packets, the negative impact of the padding by the adversary tends to cancel each other. The negative impact may be further mitigated by using redundant pairs of packets to encode the watermark. However, this would increase the number of packets needed. So this is essentially a tradeoff between the robustness and the efficiency.

As previously discussed, disclosed embodiments requires at least partial network coverage of distributed monitoring stations. This is a common requirement for network traceback approaches, especially since the coverage does not need to be global. The accuracy of the trace may be proportional to the number and placement of monitoring nodes.

A contribution of the presently disclosed embodiments is that they address the four major obstacles in botmaster traceback: 1) stepping stones, 2) encryption, 3) flow mixing and 4) a low traffic volume between bot and botmaster. Embodiments of the watermarking traceback approach are resilient to stepping stones and encryption, and require only a small number of packets in order to embed a high-entropy watermark into a network flow. The watermarked flow can be tracked even when it has been mixed with randomized chaff traffic. Due to these characteristics, this approach is uniquely suited for real-time tracing of the interactive, low-traffic botnet C&C communication between a bot and its botmaster.

The watermarking traceback was both analytically and experimentally verified. In trials on public Internet IRC servers, embodiments were able to achieve virtually a 100 percent TPR with an FPR of less than $10^{-5}$. Embodiments may trace a watermarked IRC flow from an IRC botnet member to the botmaster's true location, even if the watermarked flow 1) is encrypted with SSL/TLS; 2) passes through several stepping stones; and 3) travels tens of thousands of miles around the world.

Alternative Embodiments

Figure 8:
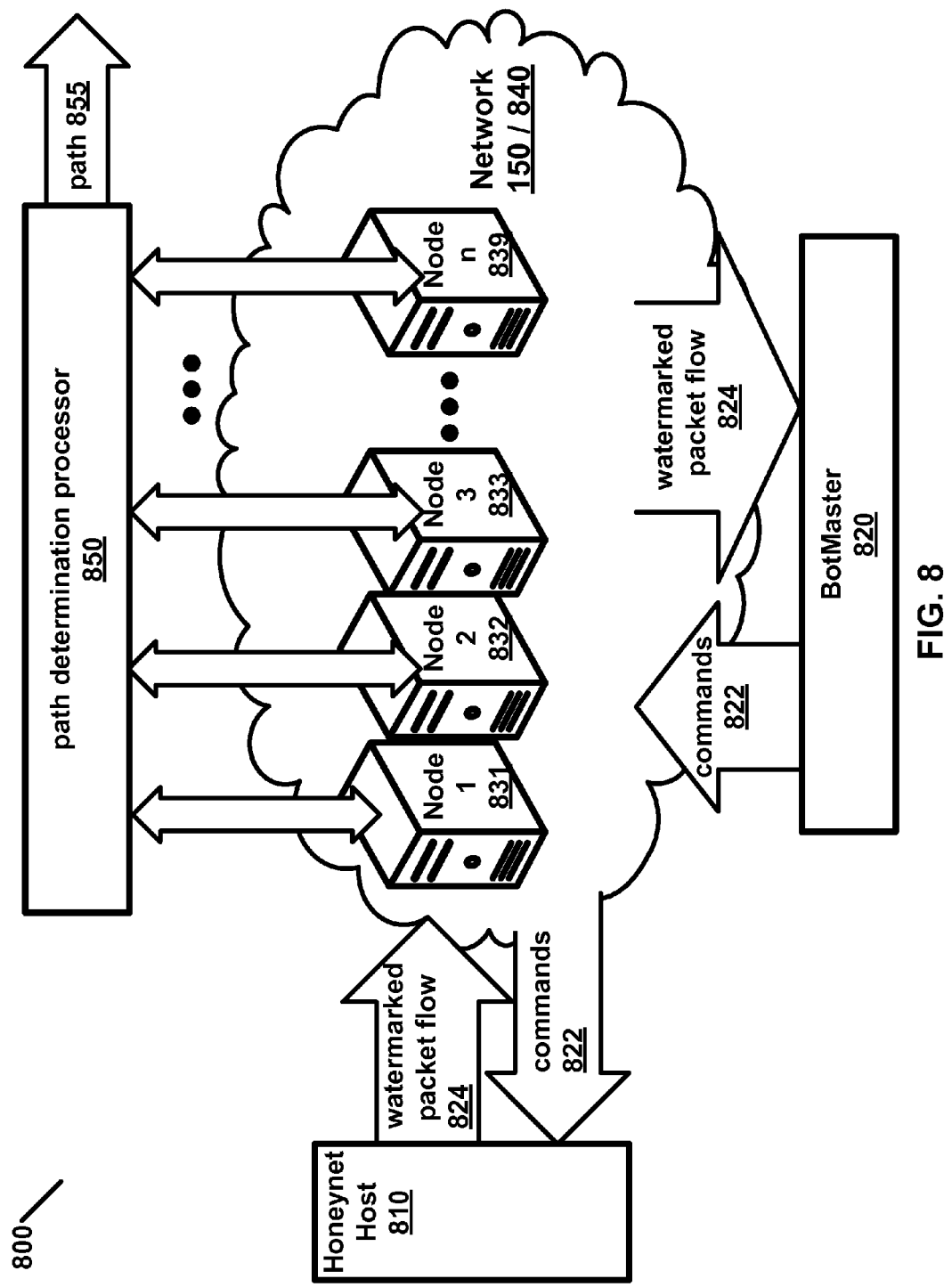
FIG. 8 is a system diagram of an aspect of an embodiment of the present invention.
Figure 9:
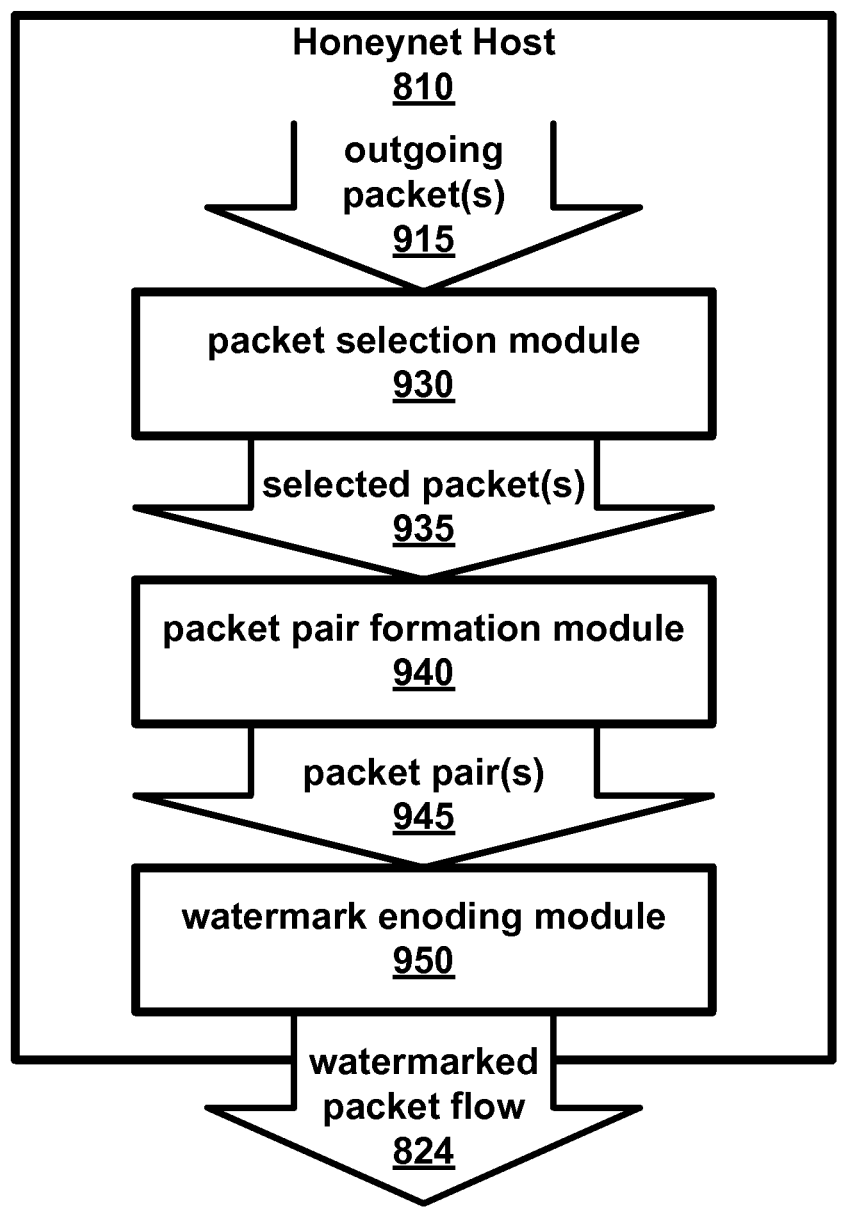
FIG. 9 is a block diagram of a honeynet host as per an aspect of an embodiment of the present invention.

Several alternative embodiments will be disclosed with reference to FIGS. F8, 9 and 10. FIG. 8 shows a system diagram of an aspect of an embodiment of the present invention. FIG. 9 is a block diagram of a honeynet host 810 shown in FIG. 8.

FIG. 8 is a diagram of a system 800 for locating a botmaster 820 connected to network 840 such as the Internet. The system several other elements connected to the network including a honeynet 810, cooperating node(s) (831, 832, 833 & 839), and a path determination processor 850.

The honeynet host 810 is configured to join a botnet. The honeynet host 810 is configured to generate a watermarked packet flow 824 by injecting a watermark in an outgoing packet flow 915 in response to commands 822 from the botmaster 820. The watermark may include a multitude of watermark bits. The honeynet host 810 may include a packet selection module 930, a packet pair formation module 940 and a watermark encoding module 950.

The packet selection module 930 is configured to choose at least two distinct packets 935 from the outgoing packet flow 915.

The packet pair formation module 940 is configured to form at least one packet pair 945 from the distinct packets 935. Each packet pair(s) 945 include a reference packet and an encoding packet.

The watermark encoding module 950 is configured to encode each of the watermark bits to a different one of the packet pairs 945 by increasing the length of the encoding packet whenever the watermark bit has a predetermined value.

The cooperating node(s) (831, 832, 833 & 839) are configured to inspect passing packet flows for the watermarked packet flow and generate tracking information related to detection of the watermarked packet flow. Specifically, the cooperating node(s) (831, 832, 833 & 839): determining a reference packet length by measuring the length of the reference packet; determine an encoding packet length by measuring the length of the encoding packet; and determines values for the watermark bits. The value of the watermark bits may be determined to be predetermined value if the difference between the encoding packet length and the reference packet length is between a range defined by a predetermined formula.

The path determination processor 850 is configured to analyze the tracking information to locate a path 855 taken by the watermarked packet flow 824.

Additionally, the embodiment may be configured to handle encrypted packets. In this configuration, the honeynet host 810 places the reference packet in the watermarked packet flow by at a time tr and the encoding packet in the watermarked packet flow at a time te. The cooperating node(s) (831, 832, 833 & 839) calculate the length of the reference packet as the sum of all packet lengths in the watermarked packet flow 824 during the duration (tr−½δ to tr+½ δ). Likewise, the cooperating node(s) (831, 832, 833 & 839) calculate the length of the encoding packet as the sum of all packet lengths in the watermarked packet flow 824 during the duration (te ½δ to te+½δ). The variable δ represents timing jitter in the watermarked packet flow 824.

Figure 10:
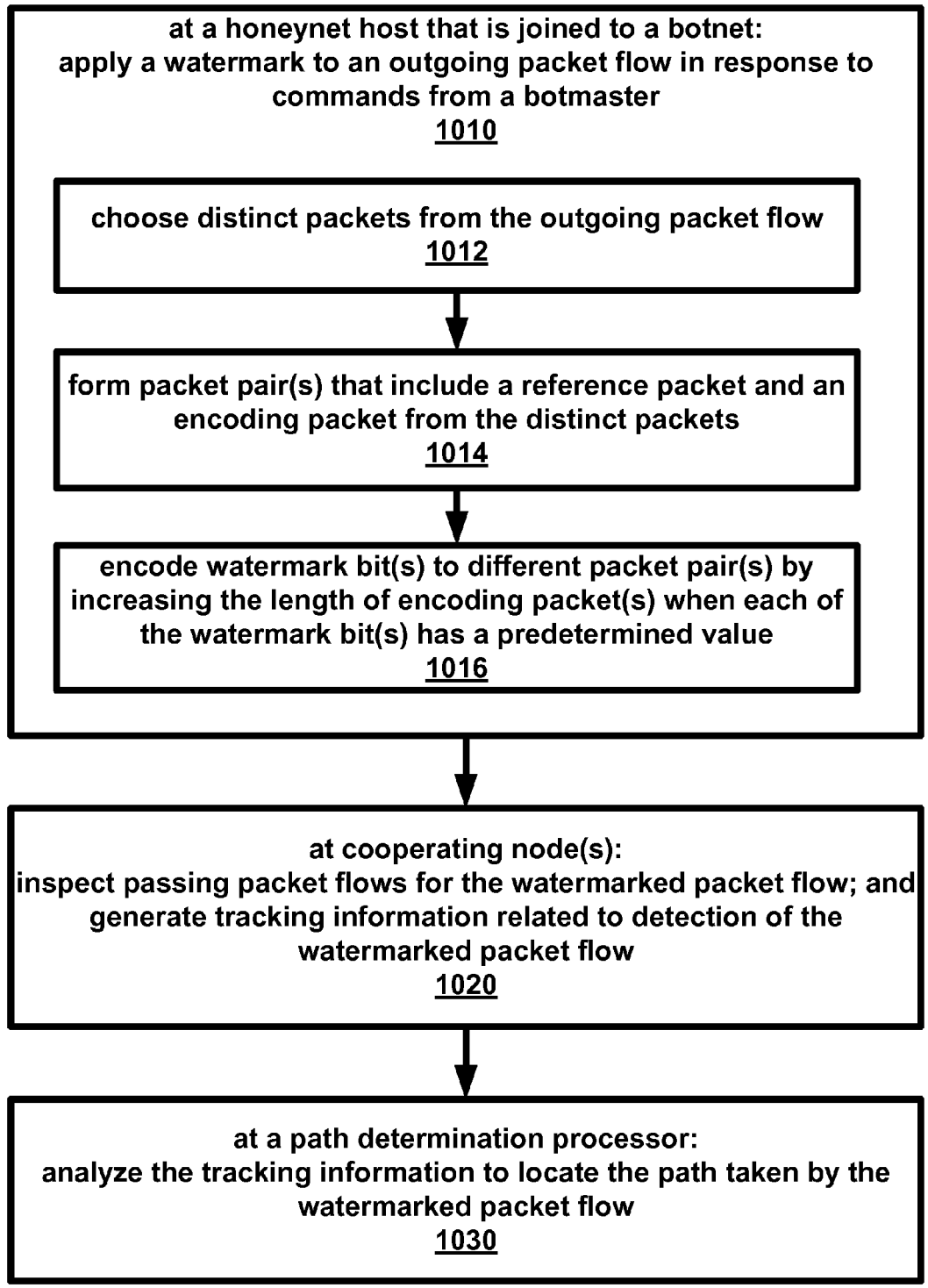
FIG. 10 is a flow diagram of an aspect of an embodiment of the present invention.

Some embodiments of the present invention may be embodied as a computer readable storage medium containing a series of instructions that when executed by one or more processors causes the one or more processors to perform a process to locate a botmaster on a network. FIG. 10 is a flow diagram of a possible embodiment of the process. At 1010, a watermarked packet flow may be generated by a honeynet host that has joined a botnet. The watermarked packet flow may be generated by injecting a watermark into an outgoing packet flow in response to commands from the botmaster. The outgoing packet flow may include at least part of a PRIVMSG. The watermark can comprise a multitude of watermark bits.

The watermark applied to the outgoing packet flow by a series of actions. At 1012 distinct packets may be chosen from the outgoing packet flow. These distinct packets may be chosen randomly. Packet pair(s) may be formed from the distinct packets at 1014. Again, the distinct packets used to form the packet pair(s) may also be random. Each of the packet pair(s) preferably includes a reference packet and an encoding packet. At 1016, each of the watermark bit(s) may be encoded to a different packet pair by increasing the length of the encoding packet when a watermark bit has a predetermined value. The length of the encoding packet may be increased in many ways including, for example, by adding padding characters to the encoding packet. The padding characters may be invisible characters. Additionally, the padding characters are inserted in random locations within the encoding packet. The increasing of the length of the encoding packet may be performed according to a predefined formula such as, for example, the formulas discussed earlier in this disclosure.

Cooperating node(s) may inspect passing packet flow for the watermarked packet flow at 1020 and create tracking information related to detection of the watermarked packet flow in the passing packet flow. During the inspection process, reference packet length(s) and encoding packet length(s) may be measured. Watermark bits may be detected by determining that one of the multitude of watermark bits has the predetermined value if the difference between an encoding packet length and its related reference packet length is between a defined range. The defined range may be defined by a predetermined formula.

At 1030, a path determination processor may analyze the tracking information to locate a path taken by the watermarked packet flow. It in envisioned that a watermarked packet flow will normally travel through intermediate nodes. There may be gaps of path information due to traffic through unmonitored nodes. In those cases, the path determination processor may fill in unreported links in the path based on information from cooperating nodes that surround the unmonitored nodes. Even if most of the nodes are not monitored, useful information may be obtained by the last cooperating node that the watermarked packet flow passed through.

In some situations, outgoing packet flow may be encrypted while other times the outgoing packet flow may be unencrypted. An alternative embodiment may utilize hybrid length-time watermarking that can handle both encrypted and unencrypted packet flows. In this case, the reference packet is placed in the watermarked packet flow at a time $t_r$; and the encoding packet is placed in the watermarked packet flow at a time $t_e$. Now, the length of the reference packet can be calculated as the sum of all packet lengths in the watermarked packet flow during the duration ($t_r-\frac{1}{2}\delta$ to $t_r+\frac{1}{2}\delta$) and the length of the encoding packet can be calculated as the sum of all packet lengths in the watermarked packet flow during the duration ($t_e-\frac{1}{2}\delta$ to $t_e+\frac{1}{2}\delta$). As stated earlier, the variable δ represents timing jitter in the watermarked packet flow. Variables $t_r$ and $t_e$ may be offset to account for various timing differences such as delays between the honeynet host and cooperating node(s) and the timing jitter. In fact, an operating offset for $t_r$ and $t_e$ may be determined by selecting the offset of a multitude of offsets that produces the highest watermark decoding success rate from the watermarked packet flow.

In this specification, "a" and "an" and similar phrases are to be interpreted as "at least one" and "one or more."

Many of the elements described in the disclosed embodiments may be implemented as modules. A module is defined here as an isolatable element that performs a defined function and has a defined interface to other elements. The modules described in this disclosure may be implemented in hardware, software, firmware, wetware (i.e. hardware with a biological element) or a combination thereof, all of which are behaviorally equivalent. For example, modules may be implemented as a software routine written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) of locating botmasters. However, one skilled in the art will recognize that embodiments of the invention could be used to trace the path of packets through a network that are destined for locations other than a botmaster. For example, one may want to trace a packet to the destination of a peer-to-peer communication.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A device, comprising one or more processors to join a botnet by generating a watermarked packet flow by causing a watermark to be injected into an outgoing packet flow in response to commands from a botmaster, the watermark comprising a multitude of watermark bits, the watermark applied to the outgoing packet flow by:
   a) choosing at least two distinct packets from the outgoing packet flow;
   b) forming at least one packet pair from the at least two distinct packets, each of the at least one packet pair including a reference packet and an encoding packet;
   c) encoding each of at least one of the multitude of watermark bits to a different one of the at least one packet pair by increasing the length of the encoding packet when each of the multitude of watermark bits has a predetermined value;
   d) placing:
      i) the reference packet in the watermarked packet flow at a time $t_r$; and
      ii) the encoding packet in the watermarked packet flow at a time $t_e$ and
   e) wherein:
      i) the outgoing packet flow is to be part of a passing packet flow inspected by at least one cooperating node processor, wherein the inspecting includes:
         (1) calculating the length of the reference packet as the sum of all packet lengths in the watermarked packet flow during the duration ($t_r - \frac{1}{2}\delta$ to $t_r + \frac{1}{2}\delta$), $\delta$ representing timing jitter in the watermarked packet flow; and
         (2) calculating the length of the encoding packet as the sum of all packet lengths in the watermarked packet flow during the duration ($t_e - \frac{1}{2}\delta$ to $t_e + \frac{1}{2}\delta$);
      ii) the at least one cooperating node processor is to create tracking information related to detection of the watermarked packet flow in the passing packet flow; and
      iii) the tracking information is to be analyzed by a path determination processor to locate a path taken by the watermarked packet flow.

2. The device of claim 1, wherein the increasing the length of the encoding packet includes adding padding characters to the encoding packet.

3. The device of claim 2, wherein the padding characters are invisible characters.

4. The device of claim 2, wherein the padding characters are inserted in random locations within the encoding packet.

5. The device of claim 1, wherein the increasing the length of the encoding packet is performed according to a predefined formula.

6. The device of claim 1, wherein the inspecting, by at least one cooperating node, passing packet flow for the watermarked packet flow further includes:
   a) determining a reference packet length by measuring the length of the reference packet; and
   b) determining an encoding packet length by measuring the length of the encoding packet.

7. The device of claim 6, wherein the inspecting, by at least one cooperating node, passing packet flows for the watermarked packet flow further includes determining that one of the multitude of watermark bits has the predetermined value if the difference between the encoding packet length and the reference packet length is between a range defined by a predetermined formula.

8. The device of claim 1, wherein $t_r$ and $t_e$ are offset to account for at least one of the following:
   a) delays between a honeynet host and at least one of the at least one cooperating node; and
   b) the timing jitter.

9. The device of claim 8, wherein an operating offset for $t_r$ and $t_e$ is determined by selecting the offset of a multitude of offsets that produces the highest watermark decoding success rate from the watermarked packet flow.

10. The device of claim 1, wherein the outgoing packet flow includes at least part of a private message (PRIVMSG).

11. The device of claim 1, wherein the analyzing includes filling in unreported links in the path.

12. The device of claim 1, wherein the path travels through at least one intermediate node.

13. The device of claim 1, wherein the outgoing packet flow is encrypted.

14. The device of claim 1, wherein the outgoing packet flow is unencrypted.

15. The device of claim 1, wherein the choosing at least two distinct packets from the outgoing packet flow includes choosing the at least two distinct packets randomly from the outgoing packet flow.

16. The device of claim 1, wherein the forming at least one packet pair from the at least two distinct packets includes forming the at least one packet pair randomly from the at least two distinct packets.

* * * * *